US006669918B2

(12) United States Patent
Schleier-Smith et al.

(10) Patent No.: US 6,669,918 B2
(45) Date of Patent: Dec. 30, 2003

(54) METHOD FOR BULK SEPARATION OF SINGLE-WALLED TUBULAR FULLERENES BASED ON CHIRALITY

(75) Inventors: Monika H. Schleier-Smith, McLean, VA (US); James C. Ellenbogen, McLean, VA (US)

(73) Assignee: The Mitre Corporation, McLean, VA (US)

( * ) Notice: Subject to any disclaimer, the term of this patent is extended or adjusted under 35 U.S.C. 154(b) by 125 days.

(21) Appl. No.: 09/922,634

(22) Filed: Aug. 7, 2001

(65) Prior Publication Data

US 2003/0031619 A1 Feb. 13, 2003

(51) Int. Cl.[7] .................................................. D01F 9/12

(52) U.S. Cl. .............................. 423/447.1; 423/445 B; 423/461

(58) Field of Search ........................ 423/445 B, 445 R, 423/447.3, 447.1, 461

(56) References Cited

U.S. PATENT DOCUMENTS

| | | | |
|---|---|---|---|
| 6,187,823 B1 | 2/2001 | Haddon et al. | 516/32 |
| 6,280,677 B1 | 8/2001 | Yakobson | 264/430 |

OTHER PUBLICATIONS

Hisao Yanagi et al., "Self–orientation of short single–walled carbon nanotubes deposited on graphite", Mar. 5, 2001, Applied Physics Letters 78(10), pp. 1355–1357.*
P. Umek et al., "Microcrystalline SWNT Material," *Carbon*, 38(11–12), 2000, (Abstract) CAPLUS online database.
P.B. Collins et al., "Engineering carbon nanotubes and nanotube circuits using electrical breakdown," *Science*, vol. 292, No. 5517, pp. 706–709, Apr. 27, 2001.
A. Hassanien et al., "Atomic structure and electronic properties of single–wall carbon nanotubes probed by scanning tunneling microscope at room temperature," *Applied Physics Letters*, vol. 73, No. 26, pp. 3839–3841, Dec. 28, 1998.
R.J. Steele et al., "Interaction of carbon nanotubes with graphite surfaces," Oral Session, Session JC–Nanotubes, 66th Annual Meeting of the Southeastern Section of the American Physical Society, Nov. 7–9, 1999.
C. Wang, et al., "Well–aligned carbon nanotube array membrane synthesized in porous alumina template by chemical vapor deposition," *Chinese Science Bulletin*, vol. 45, No. 15, pp. 1373–1376, Aug. 2000.
R.R. Schlitter et al., "Single crystals of single–walled carbon nanotubes formed by self–assembly," *Sciencexpress*, Abstract, Apr. 2001.

(List continued on next page.)

*Primary Examiner*—Stuart L. Hendrickson
*Assistant Examiner*—Peter J Lish
(74) *Attorney, Agent, or Firm*—Rosenberg, Klein & Lee (57) ABSTRACT

A method for bulk separation of single-walled tubular fullerenes (100) based on chirality is provided wherein a first step is the formation of a template (40) on a crystalline substrate (30). The template (40) has a plurality of openings (32) which are oriented to energetically favor adsorption of a respective plurality of single-walled fullerenes (100) having a tubular contour and a selected chirality. Next, the template (40) is exposed to a suspension (16) of single-walled tubular fullerenes (100) of random chiralities for adsorption of single-walled tubular fullerenes (100) of the selected chirality into the openings (32) of template (40). Then, the template (40) is removed from exposure to the suspension (16) and the adsorbed single-walled tubular fullerenes (100) of the selected chirality are removed from the template (40). The template (40) may then be reused to adsorb further tubular fullerenes (100) of the selected chirality from a suspension (16) of tubular fullerenes (100) of random chiralities.

24 Claims, 6 Drawing Sheets

OTHER PUBLICATIONS

J.H. Chen et al., "Electrochemical synthesis of polypyrrole/carbon nanotube nanoscale composites using well–aligned carbon nanotube arrays," *Appl. Phys. A73*, pp. 129–131, Jun. 2001.

O.E. Alon et al., "High harmonic generation of soft X–rays by carbon nanotubes," *Physical Review Letters*, vol. 85, No. 24, pp. 5218–5221, 2000.

D. Goldhaber–Gordon, M.S. Montemerlo, J.C. Love, G.J. Opitech, and J.C. Ellenbogen, "Overview of nanoelectronic devices," *Proceedings of the IEEE*, vol. 85, No. 4, Apr. 1997, pp. 521–540.

J.C. Ellenbogen and J.C. Love, "Architectures for molecular electronic computers; 1. Logic structures and an adder designed from molecular electronic diodes," *Proceedings of the IEEE*, vol. 88, No. 3, Mar. 2000, pp. 386–426.

S. Iijima, "Helical Microtubules of Graphitic Carbon," *Nature*, vol. 354, pp. 56–58, 1991.

M.S. Dresselhaus, G. Dresselhaus, and P.C. Eklund, "Observation of Single–Wall Carbon Nanotubes," in *Science of Fullerenes and Carbon Nanotubes*, New York: Academic Press, 1996, pp. 765–769.

D. Dekker, "Carbon nanotubes as molecular quantum wires," *Physics Today*, May 1999.

P.G. Collins and P. Avouris, "Nanotubes for electronics," *Scientific American*, Dec. 2000.

R. Saito, M. Fujita, G. Dresselhaus, and M.S. Dresselhaus, "Electronic structure of graphene tubules based on $C_{60}$," *The American Physical Society*, 1992.

N. Hamada, S.I. Sawada, and A. Oshiyama, "New one–dimensional conductors: graphitic microtubules," *Phys. Rev. Lett.*, vol. 68, No. 10, pp. 1579–1581, 1992.

J.W.G. Wildoer, L.C. Venema, A.G. Rinzler, R.E. Smalley, and C. Dekker, "Electronic structure of atomically resolved carbon nanotubes," *Nature*, vol. 391, pp. 59–62, 1998.

T.W. Odom, J.–L. Huang, P. Kim, and C.M. Lieber, "Atomic structure and electronic properties of single–walled carbon nanotubes," *Nature*, vol. 391, pp. 62–64, 1998.

L.C. Venema, V. Meunier, P. Lambin, and C. Dekker, "Atomic structure of carbon nanotubes from scanning tunneling microscopy," *Phys. Rev. B*, vol. 61, No. 4, pp. 2991–2996, 2000.

C.T. White, D.H. Robertson, and J.W. Mintmire, "Helical and rotational symmetries of nanoscale graphitic tubules," *Phys. Rev. B*, vol. 47, pp. 548–5488, 1993.

J. Liu, et al. "Fullerene Pipes," *Science*, vol. 280, pp. 1253–1256, 1998.

J.D. Schall and D.W. Brenner, "Molecular Dynamics Simulations of Carbon Nanotube Rolling and Sliding on Graphite," paper for *Molecular Simulations '99*.

B. Buldum and J.P. Lu, "Atomic Scale Sliding and Rolling of Carbon Nanotubes," *Phys. Rev. Lett.*, vol. 83, No. 24, pp. 5050–5053, 1999.

M.R. Falvo, et al. "Nanometre–scale rolling and sliding of carbon nanotubes," *Nature*, vol. 397, pp. 236–238, 1999.

H. Tamon, M. Atsushi, and M. Okazaki, "On Irreversible Adsorption of Electron–Donating Compounds in Aqueous Solution," *Journal of Colloid and Interface Science*, vol. 177, pp. 384–390, 1996.

S. Peng and K. Cho. "Chemical control of nanotube elecronics," *Nanotechnology*, vol. 11, pp. 57–60, 2000.

P. Nikolaev, et al. "Gas–phase catalytic growth of single–walled carbon nanotubes from carbon monoxide," *Chemical Physics Letters*, vol. 313, pp. 91–97, 1999.

M.S. Dresselhaus, G. Dresselhaus, and P.C. Eklund, "Relation Between Tubules and Fullerenes," in *Science of Fullerenes and Carbon Nanotubes*. New York: Academic Press, 1996, pp. 757–761.

Hamon, et al., "Dissolution of Single–Walled Carbon Nanotubes," *Advanced Materials*, vol. 11, No. 10, pp. 834–840, 1999.

Sigma Chemical Company, Product Information for Triton X–100.

Uchihashi, et al., "Self–assembled monolayer of adenine base on graphite studied by noncontact atomic force microscopy," *Physical Review B*, vol. 60, No. 11, pp. 8309–8313.

Sowerby, Stephen J., and George B. Petersen, "Scanning tunneling microscopy of uracil monolayers self–assembled at the solid/liquid interface," *J. Electroanalytical Chem.*, vol. 433, pp. 85–90, 1997.

\* cited by examiner

(10,10) SWNT−CONH−4−$C_6H_4(CH_2)_{13}CH_3$

FIG.5

METHOD FOR BULK SEPARATION OF SINGLE-WALLED TUBULAR FULLERENES BASED ON CHIRALITY

BACKGROUND OF THE INVENTION

1. Field of the Invention

This invention directs itself to a method for bulk separation of single-walled tubular fullerenes based on chirality. More in particular, the present invention is directed to a method for bulk separation of single-walled tubular fullerenes utilizing a template for adsorbing single-walled tubular fullerenes of a predetermined chirality. Still further, the present invention is directed to a method of bulk separation which takes advantage of a phenomenon wherein tubular fullerenes self-orient on a similar, but planar lattice structure in an angular orientation which varies as a function of the chirality of the tubular fullerene.

2. Prior Art

Tubular fullerenes and, in particular, carbon nanotubes are of great interest because of their unique electrical and mechanical properties for use in constructing nanoscale electronic circuitry and mechanical devices. It has been discovered that the electrical properties of a carbon nanotube vary as a function of its chirality, the angle at which the graphitic lattice spirals about the tubular contour of the nanotube. Electrical properties of carbon nanotubes can vary between metallic, highly conductive structures and those which are semiconducting. One of the major hurdles to commercial utilization of these unique structures has been the problem of synthesizing the structures in a desired chirality. Currently, the synthesis of carbon nanotubes produces a mixture of chiralities. Separating nanotubes of a desired chirality from all those produced has required a very tedious and inefficient mechanical separation process utilizing a nanoprobe (e.g., an atomic force microscope). Thus, even for laboratory use, separation of a desired chirality from all those which are produced is a painstakingly slow process.

One recent approach which permits the selective preservation of the semiconducting types of nanotubes in bundles, or "ropes," of aligned single-walled carbon nanotubes has been demonstrated by IBM Corp. In that method, ropes of nanotubes of random chiralities are deposited on a silicon wafer that is then covered by a dense array of source, drain and gate connections in order to form field-effect devices. Subsequently, a voltage is applied over the nanotube ropes blowing out and destroying the metallic tubes, but leaving the semiconducting type unscathed. Thus, the surviving semiconducting nanotubes are available and still affixed as ropes to the contacts, where they may be utilized to produce active devices. However, the method provides no means of physically segregating or sorting the nanotubes into separate assemblies or containers. Nor does it provide a means for accumulating the highly conductive nanotubes. More importantly, this approach does not apply at all to the problem of sorting the nanotubes according to their chiral structure.

Whereas in the invention of the subject Patent Application a method is provided where either semiconducting or highly conductive nanotubes can be physically sorted or separated in bulk quantities from the typical mixture of nanotube types synthesized by current methods, which thus provides advantages over the prior art methods. Still further, the method of the invention of the subject Patent Application is far simpler to implement than prior art methods.

SUMMARY OF THE INVENTION

A method for bulk separation of single-walled tubular fullerenes based on chirality, is provided. The method includes the steps of:
a. forming a template on a crystalline substrate having a plurality of openings oriented to energetically favor adsorption of a respective plurality of single-walled fullerenes having a tubular contour and a selected chirality;
b. exposing the template to a suspension of single-walled tubular fullerenes of random chiralities for adsorption of single-walled tubular fullerenes of the selected chiralities into the openings of the template;
c. removing the template from the suspension; and,
d. removing the adsorbed single-walled tubular fullerenes of the selected chirality from the template.

In order to form the template, a crystalline substrate is provided which has a predetermined lattice structure. Then, a plurality of single-walled tubular fullerenes of the selected chirality are deposited on the substrate. The deposited single-walled tubular fullerenes have a lattice structure that is disposed in aligned relationship with the predetermined lattice structure of the crystalline substrate. Next, exposed areas of the crystalline substrate surrounding each of the single-walled tubular fullerenes are coated with a composition having a greater affinity for the crystalline substrate than for the single-walled tubular fullerenes of the selected chirality. Lastly, the single-walled tubular fullerenes that had been deposited on the substrate are removed, leaving the composition coating the substrate undisturbed with elongated openings that define a template for the subsequent adsorption, onto the substrate within the openings, of tubular fullerenes having the same chirality as that of the tubular fullerenes utilized to form the template.

From another aspect, a method for bulk separation of single-walled tubular fullerenes based on chirality is provided, which method includes the steps of:
a. providing a crystalline substrate having a predetermined lattice structure;
b. depositing a plurality of single-walled tubular fullerenes of a selected chirality on the substrate, the deposited single-walled tubular fullerenes having a lattice structure thereof in aligned relationship with the predetermined lattice structure of the crystalline substrate;
c. depositing a layer of molecules on the crystalline substrate surrounding each of the single-walled tubular fullerenes of the selected chirality, the molecules being of a composition having a greater affinity for the substrate than for the single-walled tubular fullerenes of the selected chirality;
d. removing the single-walled tubular fullerenes from the crystalline substrate to form a template without disturbing the layer of molecules;
e. exposing the template to a suspension of single-walled tubular fullerenes of random chiralities for adsorption thereon of single-walled tubular fullerenes of the selected chirality;
f. removing the template from the suspension;
g. exposing the template to a solvent solution for removing the adsorbed single-walled tubular fullerenes therefrom; and,
h. recovering the single-walled tubular fullerenes of the selected chirality from the solvent solution.

DETAILED DESCRIPTION OF THE PREFERRED EMBODIMENT

In order to continue the present trend in miniaturization of electronics, it will be necessary to construct computer circuits on a molecular scale. To that end, there has been much research in the use of single-walled tubular fullerenes, particularly carbon nanotubes, as both interconnecting conductors and as active devices in molecular scale circuits. These molecular structures are of interest because of their unique electrical properties which may be metallic, and highly conductive, or semiconducting. Whether a tubular fullerene exhibits metallic or semiconducting properties is related to the chirality of the tubular structure. Chirality is an angle that represents the twist or spiral of the lattice structure, as will be further described in following paragraphs. However, present methods of tubular fullerene synthesis produce a mixture of chiralities, typically in a ratio of two-thirds having a semiconducting characteristic and one-third having a metallic characteristic.

Figure 1A:
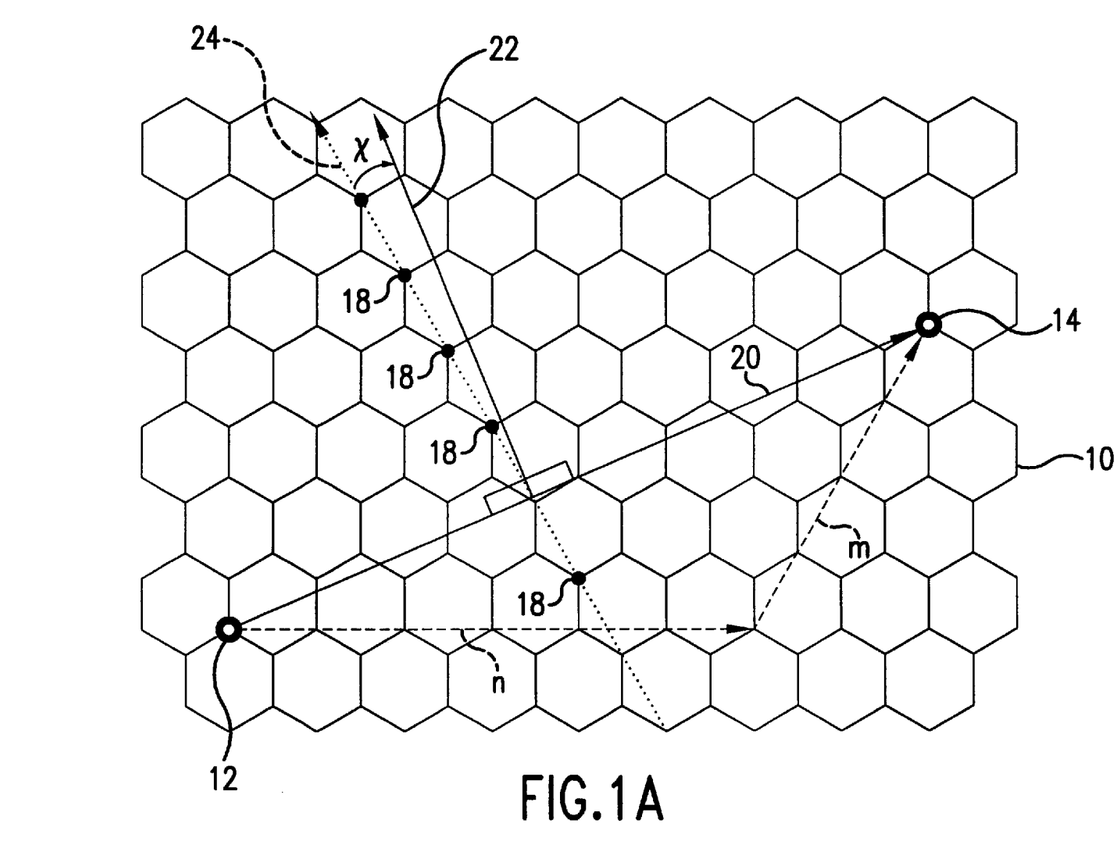
FIG. 1A is a diagram illustrating the derivation of the chiral angle.

In order to better understand the concept of chirality, reference is now made to FIG. 1A. In FIG. 1A, the planar lattice 10 is shown wherein an arbitrary atom 12 defines the origin for the chiral vector 20 that extends from atom 12 to another atom 14 on the lattice which would coincide with the atom 12 if the planar lattice were rolled to form a nanotube. The chiral vector 20 is the summation of n times a first unit vector $a_1$ and m times a second unit vector $a_2$, where the unit vectors are defined from the hexagonal geometry of the lattice, as is well known in the art. Thus, n and m are integers of the vector equation:

$$R = na_1 + ma_2 \quad (1)$$

Therefore, the axis 22 of the nanotube is defined as a line projecting orthogonally from the chiral vector 20. The vector description for the nanotube defined by vector 20 is a (6,4) nanotube. Where n does not equal m, the axis of the lattice 24, a line projected through corresponding atoms 18 of the lattice, does not coincide with the axis of the nanotube 22, such deviating by the chiral angle $\chi_{(n,m)}$.

Figure 1B:
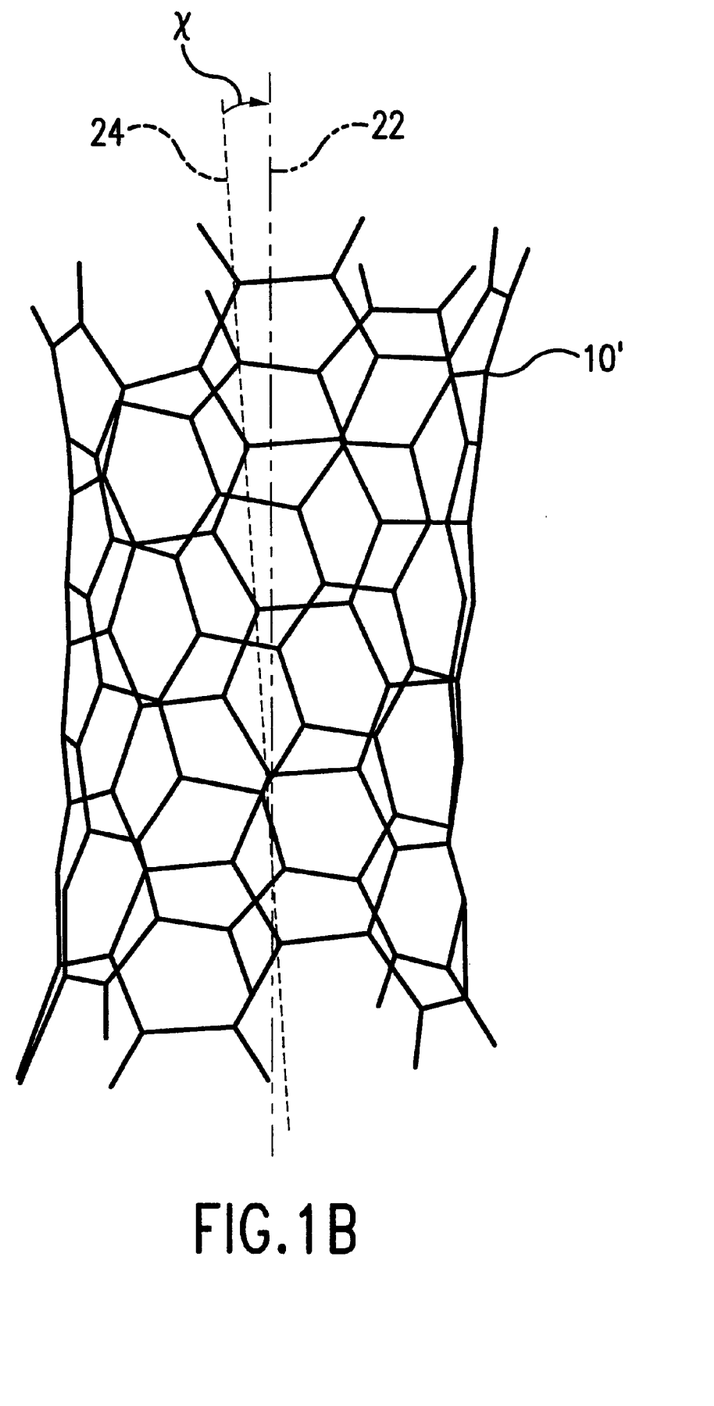
FIG. 1B is a perspective view of a tubular fullerene illustrating the chirality thereof.

In FIG. 1B, the tubular fullerene 100 represents the resulting structure obtained when the lattice 10 is rolled, as previously described. The single-walled carbon nanotube has a longitudinal axis 22 with a lattice axis 24 which deviates from the longitudinal axis of the nanotube by the chiral angle, as previously described.

Figure 2:
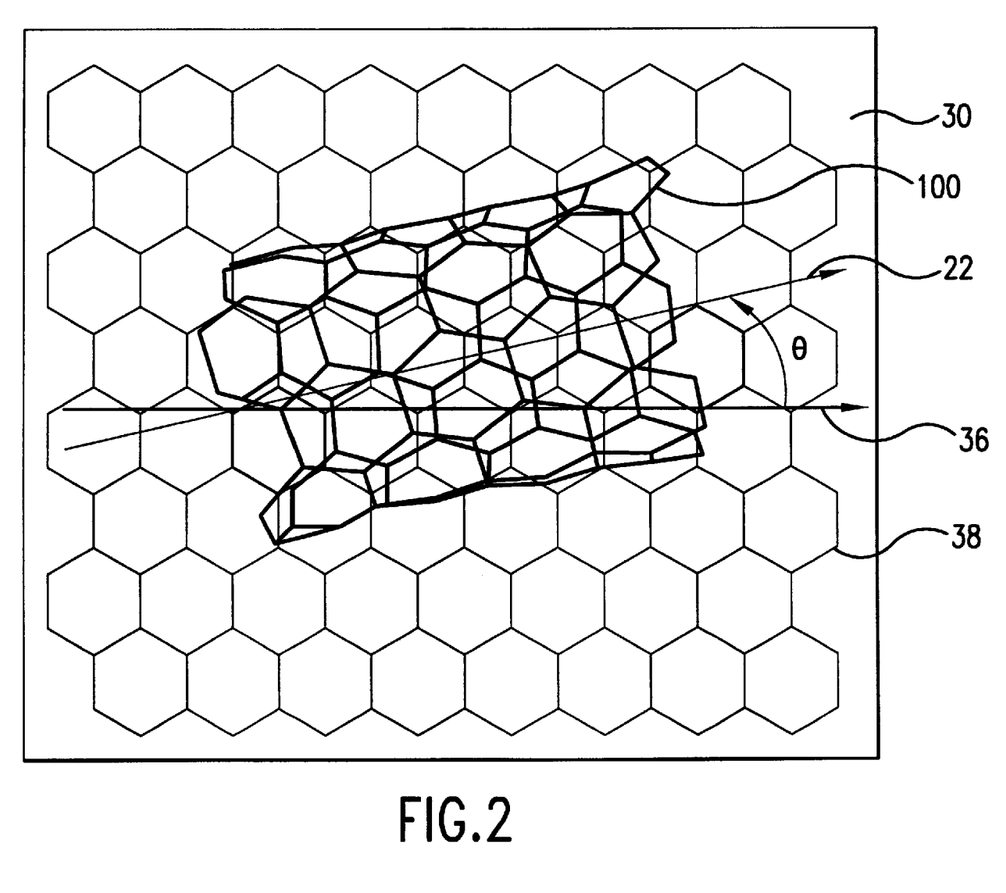
FIG. 2 is a schematic illustration of a tubular fullerene self-orienting on a crystalline substrate lattice.

To further understand the principles upon which the method of bulk separation of single-walled tubular fullerenes is based, reference is now made to FIG. 2. In FIG. 2, a tubular fullerene 100 is disposed on a crystalline substrate 30. In this case, a carbon nanotube is illustrated as being disposed on a graphite substrate, the structures of each being formed by hexagonal lattices. Where the two structures have the same lattice structure, the tubular fullerene has an energetically favored orientation wherein the hexagonal lattices of the tubular fullerene and the substrate are mutually aligned. That is, they are said to be disposed in registry with one another. Therefore, as the tubular fullerene 100 is formed by a lattice with a chiral twist, the axis 22 of the tubular fullerene 100 is angularly displaced with respect to a longitudinal axis 36 of the substrate lattice 38. The angular orientation of the tubular fullerene axis 22 relative to the substrate lattice axis 36 is an angle $\Theta$ which is equal to the chiral angle $\chi$. The angle $\Theta$ is also referred to as the "locking angle", as it is the angle where the nanotube establishes an equilibrium orientation with a very sharp energy minimum that leads to atomic scale locking of the nanotube. That energy profile repeats every 60°, reflecting the lattice symmetry of the crystalline substrate. Therefore, when tubular fullerenes are deposited on a crystalline substrate lattice with substantially the same lattice structure, as when carbon nanotubes are deposited on a graphite substrate, nanotubes of different chiralities will be self-organized at different and stable angular orientations. It is this phenomenon that provides the basis for the bulk separation method of the instant invention.

Raw fullerene nanotubes usually are produced in the form of long, tangled ropes of many nanotubes, which are held in close contact by strong electrostatic van der Waals interactions. As is well known in the art, the nanotube ropes can be separated and cut to form individual shorter open-end tubular fullerenes by sonication in a 3:1 mixture of concentrated sulfuric and nitric acids (98% and 70%, respectively) at 40° Centigrade. The thus produced "fullerene pipes" are more manipulable and better suited for use in molecular electronics, and for being functionalized to improve the solubility thereof, as will be discussed in following paragraphs.

Figure 3A:
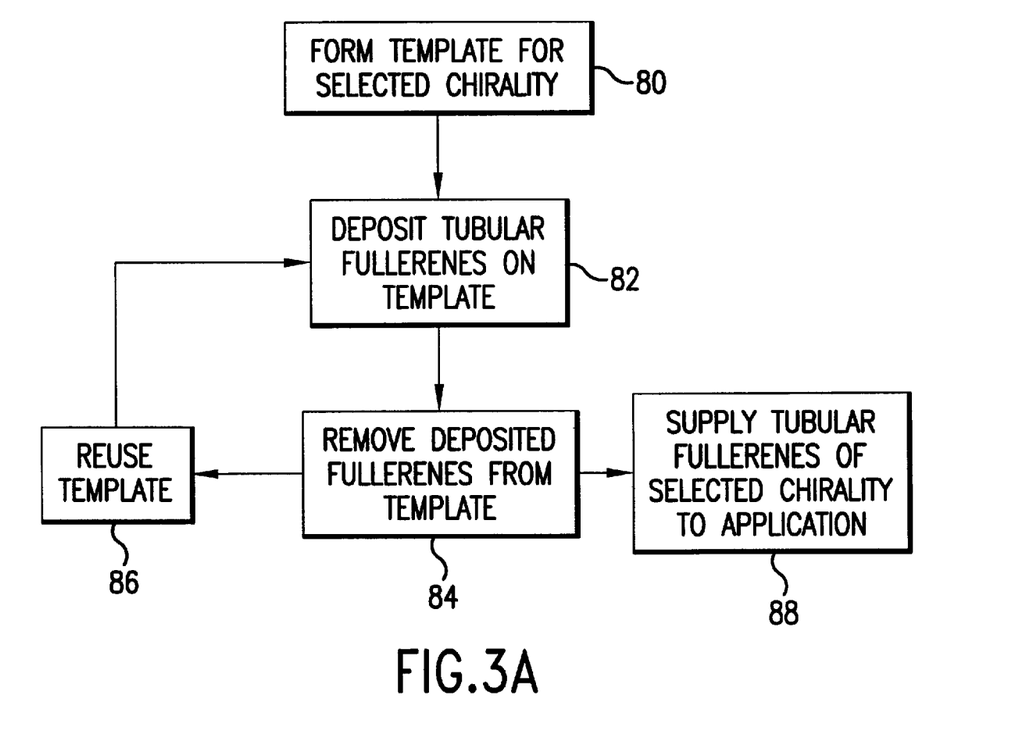
FIG. 3A is a diagrammatic representation of the bulk separation process of the present invention.
Figure 4:
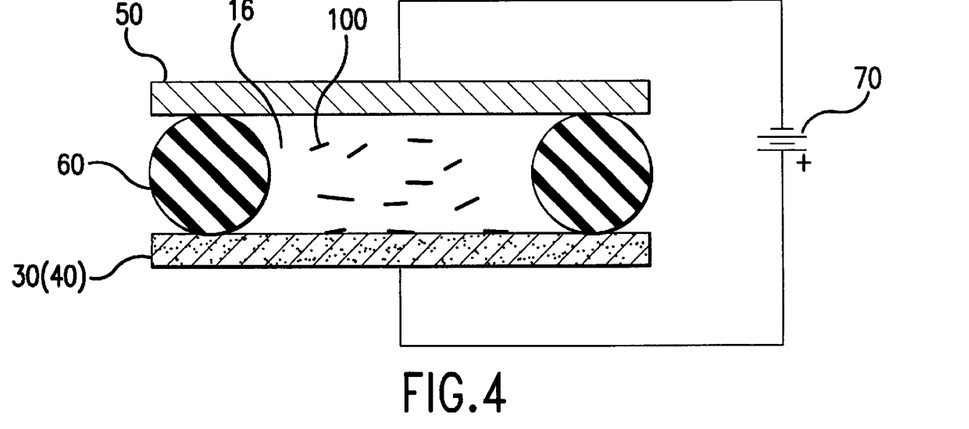
FIG. 4 is a schematic illustration of an electrodeposition apparatus useful in the method of the present invention; and, FIG. 5 is a schematic illustration of the structure of an end functionalized single-walled tubular fullerene useful in the practice of the present invention.

A schematic representation of the procedure for bulk separation of tubular fullerenes based on chirality is shown in FIG. 3A. The first step 80 in the procedure is the formation of a template for fullerenes of a selected chirality. A method of template formation will be described in following paragraphs. In the next step 82, the tubular fullerenes having the selected chirality are deposited on the template. One method which has been used to deposit the fullerenes on a crystalline substrate, and in particular, carbon nanotubes on a graphite substrate, is an electrodeposition process, as shown in FIG. 4.

In the electrodeposition process, the substrate 30, or template 40, forms the positive electrode of the system. An O-ring 60 forms the side walls of a container for a suspension 16 of tubular fullerenes 100. Disposed on the opposing side of the O-ring 60 is the negative electrode 50, which is typically formed of stainless steel. DC power source 70 is coupled between the electrodes 30 or 40 and 50. The tubular fullerenes 100 form a stable colloidal aqueous suspension 16 in which the individual "pipes" assume a negative charge. Thus, when the DC power supply is connected between the electrodes, the tubular fullerenes are electrodeposited on the substrate. This apparatus is useful for both forming the template and subsequently depositing nanotubes on the template.

Where electrode deposition is utilized to deposit the tubular fullerenes on the template 40 in step 82, the template 40 preferentially receives tubular fullerenes of a predetermined chirality, a chirality which was selected in the formation of the template, as will be described in following paragraphs. Subsequent to the preferential deposition of tubular fullerenes of the selected chirality, the template is removed from its exposure to the colloidal aqueous suspension of tubular fullerenes and the deposited fullerenes are removed from the template in step 84. While any method of removal which is not detrimental to the structure of the fullerenes or the template may be utilized, the simplest method is the dissolution of the adsorbed fullerenes in an organic solvent followed by the recovery therefrom. One organic solvent useful in practicing the invention is ether, but other solvents such as dichloromethane and trichloromethane also may be used.

Figure 5:
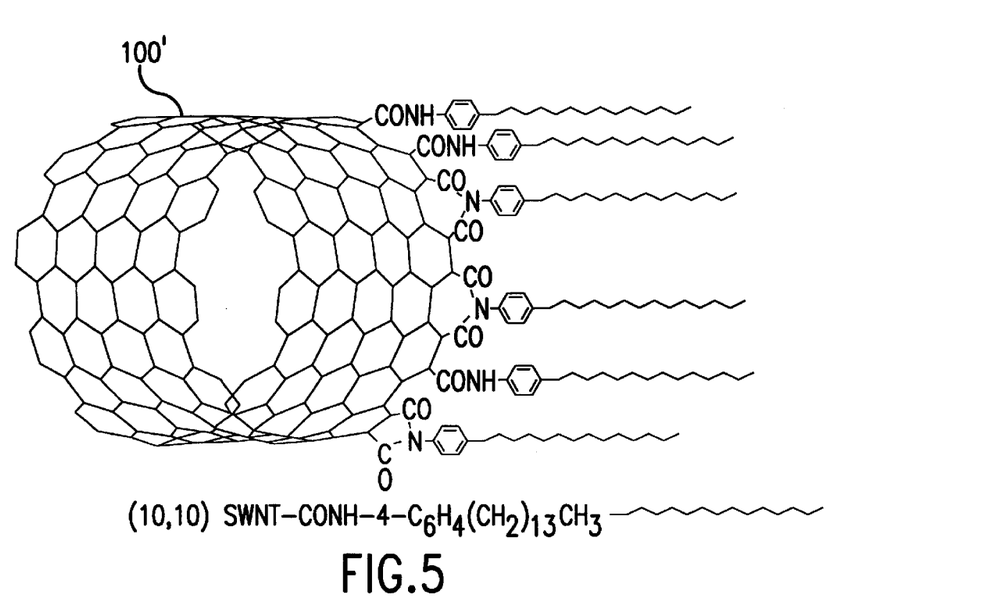

The solubility of the tubular fullerenes may be enhanced by functionalizing the tubular fullerenes with long-chain amines. Tubular fullerenes 100', end-functionalized with amide groups, as illustrated schematically in FIG. 5, are disclosed in Hamon, et al., "Dissolution of Single-Walled Carbon Nanotubes," *Advanced Materials,* Vol. 11, No. 10, 1999, and provide enhanced solubility without impairing deposition of the tubular fullerene on the template 40. Similar end functionalization is described in U.S. Pat. No. 6,187,823. Side functionalization of the tubular fullerenes also may provide the desired enhanced solubility thereof, without disturbing the self-orienting deposition character of the fullerenes.

Subsequent to the dissolution of the tubular fullerenes, the template in step 86 is prepared for reuse. Any excess ether on the template is evaporated and the template may be washed and dried prior to being reused in step 82. The dissolved fullerenes are recovered in step 88, by evaporation of the solvent, leaving the tubular fullerenes of the selected chirality for use to enlarge the template or in an intended application, such as in the manufacture of nanoscale active electronic devices, or conductors therefor.

Figure 3B:
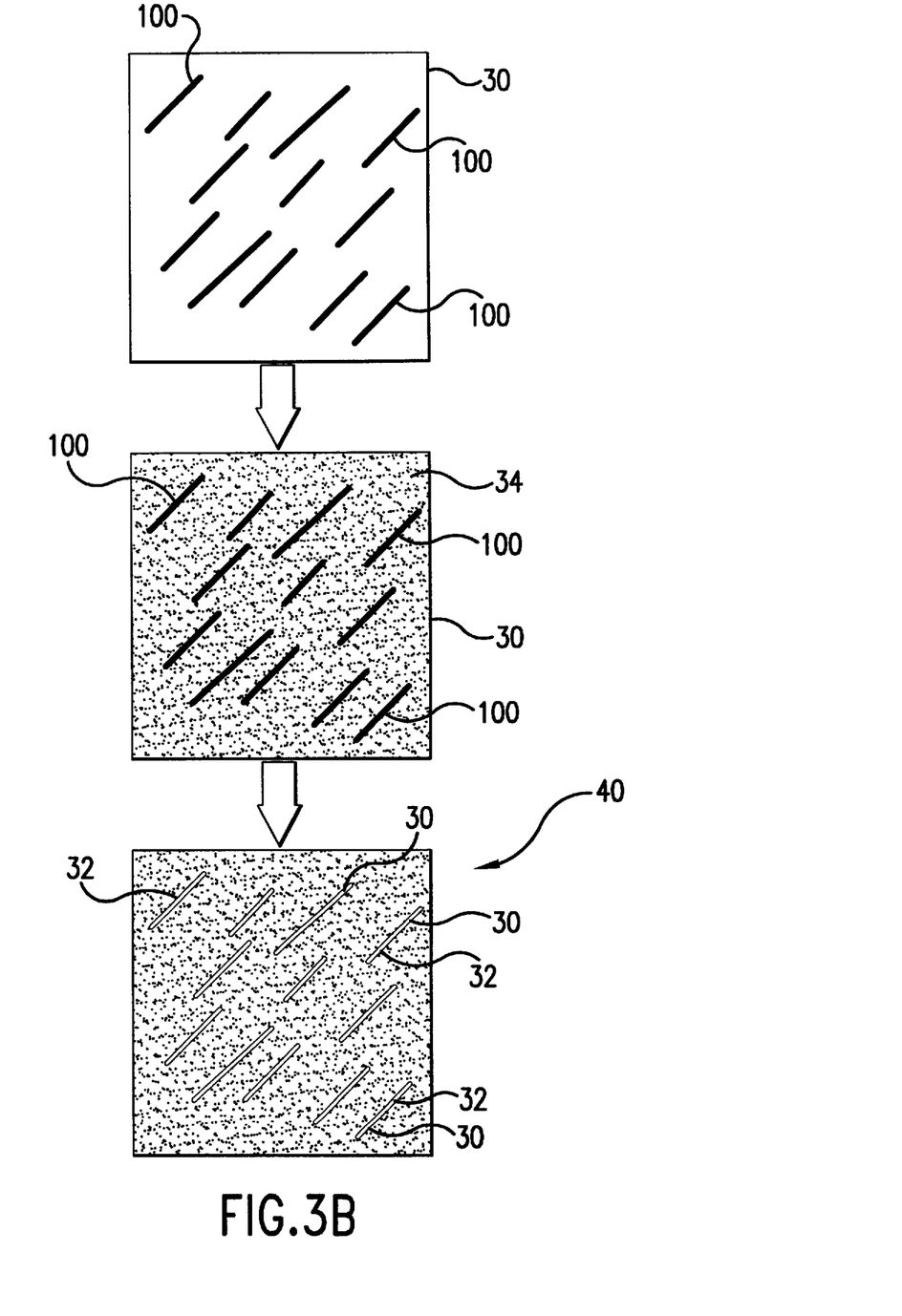
FIG. 3B is a schematic illustration of the method of forming a template of the present invention.

Referring now to FIG. 3B, there is shown the method for forming the template 40. Initially, a crystalline substrate 30 is provided having the necessary planar lattice structure corresponding to the tubular lattice of the fullerenes 100 to be separated. When carbon nanotubes are the fullerenes to be separated utilizing the template, the crystalline substrate is a freshly-cleaved highly oriented pyrolitic graphite substrate. The graphite substrate has a crystallographic orientation defined by a plane having Miller indices of (111). Single-walled tubular fullerenes of a selected chirality are put into an aqueous suspension by the addition of a surfactant. One surfactant useful in the practice of the instant invention is octylphenol ethylene oxide condensate sold under the trade name Triton X-100 by Union Carbide. The single-walled tubular fullerenes of the selected chirality are obtained initially utilizing the standard and tedious technique of mechanical separation utilizing such devices as an atomic force microscope. Since this method of separation is so tedious, only a small number may be obtained to produce a first template. Then, the fullerenes used to make that template can be combined with fullerenes separated using that template to produce a second template capable of separating double the number of fullerenes. This iterative process can be repeated, each time doubling the template capacity to adsorb tubular fullerenes of the selected chirality.

As previously described, the single-walled tubular fullerenes 100 are deposited on the crystalline substrate 30 from the suspension 16 utilizing the electrodeposition apparatus illustrated in FIG. 4. Subsequently, the water and surfactant are washed from the substrate using methanol and a spin coater, as an example. The adsorbed tubular fullerenes 100 will remain on the surface of the substrate 30 in particular orientations defined by their chirality. Next, a saturated aqueous solution of a nucleotide base adenine is applied to the surface of the substrate after it has been heated to approximately 80° Centigrade. A monolayer 34 of the base will self-assemble spontaneously on the surface of the substrate surrounding the tubular fullerenes 100 already adsorbed thereon. Next, the water is evaporated from the surface, leaving the tubular fullerenes 100 surrounded by the adenine adsorbate template material 34, that also covers the remaining surface of substrate 30. In addition to adenine, other nucleotide bases, such as uracil, thymine and guanine, and similar structures such as xanthine, may also be utilized, as well as other compositions that can be deposited on the crystalline substrate without affecting the energetic advantage of tubular fullerenes of a predetermined chirality for a particular orientation on the substrate, and are not soluble in the organic solvent that is subsequently used to remove the tubular fullerenes 100.

In order to form the template 40, the tubular fullerenes 100 are removed from the surface without disturbing the adenine adsorbate surrounding the fullerenes 100. As previously discussed, the tubular fullerenes are dissolved in an ether, or other organic solvent, leaving the elongated openings 32 which expose portions of the substrate into which other tubular fullerenes may be adsorbed, tubular fullerenes whose chirality provides the preferential orientation that matches the particular orientation of the openings 32 of crystalline substrate 30. Once the template 40 has been formed, it can be continuously reused to adsorb further tubular fullerenes 100 having the same chirality as the fullerenes 100 which were originally used to form the template.

The crystalline substrate 30 may be formed by a substrate of highly oriented pyrolitic graphite, or a graphite substituted with boron and nitrogen, or a substrate formed of boron nitride. The corresponding tubular fullerenes may be formed by carbon nanotubes, carbon nanotubes substituted with boron and nitrogen, or boron nitride nanotubes. Other substrate and fullerene materials may be used that exhibit the same self-orienting properties as those specifically listed herein.

Although this invention has been described in conjunction with specific forms and embodiments thereof, it will be appreciated that various modifications other than those discussed above may be resorted to without departing from the spirit or scope of the invention. For example, equivalent method steps may be substituted for those specifically shown and described, different solvents, surfactants or template coating compositions can be used in place of those described herein, certain processes may be used independently of other processes, and in certain cases, particular sequences of method steps may be reversed or interposed, all without departing from the spirit or scope of the invention as defined in the appended claims.

What is being claimed is:

1. A method for bulk separation of single-walled tubular fullerenes based on chirality, comprising the steps of:
   a. forming a template on a crystalline substrate having a plurality of openings oriented to energetically favor adsorption of a respective plurality of single-walled fullerenes having a tubular contour and a selected chirality;
   b. exposing said template to a suspension of single-walled tubular fullerenes of random chiralities for adsorption of single-walled tubular fullerenes of said selected chirality within said openings of said template;
   c. removing said template from said suspension; and,
   d. removing said adsorbed single-walled tubular fullerenes of said selected chirality from said template.

2. The method as recited in claim 1, wherein said step of forming a template includes the steps of:
   a. providing said crystalline substrate having a predetermined lattice structure;
   b. depositing a plurality of single-walled tubular fullerenes of said selected chirality on said substrate, said deposited single-walled tubular fullerenes having a lattice structure thereof in aligned relationship with said predetermined lattice structure of said crystalline substrate;
   c. coating areas of said crystalline substrate surrounding each of said single-walled tubular fullerenes with a composition having a greater affinity for said crystalline substrate than for said single-walled tubular fullerenes of said selected chirality; and,
   d. removing said single-walled tubular fullerenes from said substrate without disturbing said composition of step c.

3. The method as recited in claim 2, wherein said step of providing a crystalline substrate includes the step of providing a substrate formed of graphite.

4. The method as recited in claim 2, wherein said step of coating includes the step of depositing a monolayer of molecules of a nucleotide base on said substrate surrounding said deposited plurality of single-walled tubular fullerenes of said selected chirality.

5. The method as recited in claim 2, wherein said step of depositing a plurality of single-walled tubular fullerenes includes the step of depositing a plurality of single-walled carbon nanotubes.

6. The method as recited in claim 5, wherein said step of depositing a plurality of single-walled carbon nanotubes includes the step of functionalizing single-walled carbon nanotubes to improve solubility thereof.

7. The method as recited in claim 6, wherein said step of functionalizing said single-walled carbon nanotubes includes the step of end functionalizing said single-walled carbon nanotubes.

8. The method as recited in claim 2, wherein said step of removing said adsorbed single-walled tubular fullerenes includes the step of exposing said coated crystalline substrate to a solvent solution.

9. The method as recited in claim 8, wherein said step of removing said adsorbed single-walled tubular fullerenes in a solvent solution includes the step of providing an organic solvent selected from the group consisting of ether, dichloromethane, and trichloromethane.

10. The method as recited in claim 2, wherein said step of coating includes the step of depositing on said crystalline substrate a composition selected from the group consisting of adenine, guanine, thymine, uracil or xanthine.

11. The method as recited in claim 2, wherein said step of depositing a plurality of single-walled tubular fullerenes includes the step of electrodepositing said single-walled tubular fullerenes.

12. The method as recited in claim 1, wherein said step of removing said adsorbed single-walled tubular fullerenes includes the steps of:
   exposing said template to a solvent solution for removing said adsorbed single-walled tubular fullerenes therefrom; and,
   recovering said single-walled tubular fullerenes of said selected chirality from said solvent solution.

13. The method as recited in claim 1, wherein said step of exposing said template includes the step of providing a suspension of plurality of single-walled carbon nanotubes.

14. The method as recited in claim 13, wherein said step of exposing said template includes the step of electrodepositing said single-walled carbon nanotubes on said template.

15. The method as recited in claim 1, further comprising the step of repeating steps b through d a selected number of times to accumulate a predetermined quantity of single-walled tubular fullerenes of said selected chirality.

16. A method for bulk separation of single-walled tubular fullerenes based on chirality, comprising the steps of:
   a. providing a crystalline substrate having a predetermined lattice structure;
   b. depositing a plurality of single-walled tubular fullerenes of a selected chirality on said substrate, said deposited single-walled tubular fullerenes having a lattice structure thereof in aligned relationship with said predetermined lattice structure of said crystalline substrate;
   c. depositing a layer of molecules on said crystalline substrate surrounding each of said single-walled tubular fullerenes of said selected chirality;
   d. removing said single-walled tubular fullerenes from said crystalline substrate to form a template without substantially disturbing said layer of molecules;
   e. exposing said template to a suspension of single-walled tubular fullerenes of random chiralities for adsorption thereon of single-walled tubular fullerenes of said selected chirality;
   f. removing said template from said suspension;
   g. exposing said template to a solvent solution for removing said adsorbed single-walled tubular fullerenes therefrom; and,
   h. recovering said single-walled tubular fullerenes of said selected chirality from said solvent solution.

17. The method as recited in claim 16, further comprising the step of reusing said template to repeat steps e through h a selected number of times to accumulate a predetermined quantity of single-walled tubular fullerenes of said selected chirality.

18. The method as recited in claim 16, wherein said step of providing a crystalline substrate includes the step of providing a substrate formed of highly oriented pyrolytic graphite.

19. The method as recited in claim 16, wherein said step of depositing a layer of molecules includes the step of depositing on said crystalline substrate a composition selected from the group consisting of adenine, guanine, thymine, uracil or xanthine.

20. The method as recited in claim 16, wherein said step of exposing said template to a solvent solution includes the step of providing an organic solvent selected from the group consisting of ether, dichloromethane, and trichloromethane.

21. A method for bulk separation of single-walled carbon nanotubes based on chirality, comprising the steps of:
   a. forming a template on a highly oriented pyrolytic graphite substrate having a plurality of openings oriented to energetically favor adsorption of a respective plurality of single-walled carbon nanotubes having a selected chirality;
   b. exposing said template to a suspension of single-walled carbon nanotubes of random chiralities for adsorption of single-walled carbon nanotubes of said selected chirality within said openings of said template;
   c. removing said template from said suspension; and,
   d. removing said adsorbed single-walled carbon nanotubes of said selected chirality from said template.

22. The method as recited in claim 21, wherein said step of forming a template includes the steps of:
   a. providing said highly oriented pyrolytic graphite substrate;
   b. depositing a plurality of single-walled carbon nanotubes of said selected chirality on said highly oriented pyrolytic graphite substrate, said deposited single-walled carbon nanotubes having a lattice structure thereof in aligned relationship with said predetermined lattice structure of said highly oriented pyrolytic graphite substrate;
   c. coating areas of said highly oriented pyrolytic graphite substrate surrounding each of said single-walled carbon nanotubes with a composition having a greater affinity for said highly oriented pyrolytic graphite substrate than for said single-walled carbon nanotubes of said selected chirality; and,
   d. removing said single-walled carbon nanotubes from said highly oriented pyrolytic graphite substrate.

23. A method for bulk separation of single-walled tubular fullerenes based on chirality, comprising the steps of:
   providing a crystalline substrate having a lattice structure;
   depositing a plurality of single-walled tubular fullerenes on said substrate with respective longitudinal axes thereof oriented at a predetermined angle with respect to an axis of said lattice structure of said substrate, wherein single-walled tubular fullerenes of only a predetermined chirality are held to said substrate; and,
   removing said single-walled tubular fullerenes held to said substrate therefrom.

24. The method as recited in claim 23, wherein the step of removing said single-walled tubular fullerenes is preceded by the step of coating areas of said substrate surrounding said single-walled tubular fullerenes with a composition having a greater affinity for said substrate than said single-walled tubular fullerenes of said predetermined chirality.

* * * * *